United States Patent Office 3,251,775
Patented May 17, 1966

---

3,251,775
LUBRICATING OIL COMPOSITIONS
La Verne N. Bauer, Cheltenham, Pa., assignor to Rohm & Haas Company, Philadelphia, Pa., a corporation of Delaware
No Drawing. Filed May 24, 1962, Ser. No. 197,286
13 Claims. (Cl. 252—51.5)

This invention deals with lubricating oil compositions. It further deals with lubricating oils containing copolymers of a specific heterocyclic copolymer. It further deals with lubricating compositions containing a specific heterocyclic compound which imparts dispersent properties, pour-point depressing action and improvements in viscosity. Especially outstanding are the sludge dispersing properties.

The specific heterocyclic compounds employed in the copolymers of this invention may be represented by the formula:

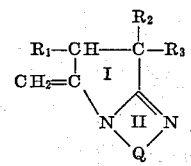

The symbol $R_1$ represents a hydrogen atom or an alkyl group of one to five carbon atoms. The symbols $R_2$ and $R_3$ may be hydrogen atoms or hydrocarbon groups containing from one to ten carbon atoms including alkyl, aralkyl, cycloalkyl, aryl, and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ when taken together with the carbon atoms to which they are joined may form a carbocyclic ring containing five to six carbon atoms which in turn may have alkyl substituents containing a total of no more than four additional carbon atoms. The total number of carbon atoms in ring I should not exceed 24. The preferred embodiments are those in which $R_1$ is a hydrogen atom, $R_2$ is a methyl group, and $R_3$ is an alkyl group. $R_2$ and $R_3$, may typically individually represent methyl, butyl, octyl, benzyl, phenylbutyl, cyclopentyl, cyclohexyl, phenyl, napthyl, butylphenyl groups and the like.

The symbol Q represents a chain of two to three carbon atoms between the two nitrogen atoms to which it is joined. Q may be a straight chain alkylene group, an alkyl-substituted alkylene group, or a cycloalkylene, arylene, or aralkylene group as long as there are no more than two to three carbon atoms between the two ring nitrogen atoms. While the upper limit of carbon atoms in Q is not especially critical, about 18 is considered the practical upper limit. Also, while the group Q may contain alkyl substituents there cannot be two alkyl substituents on either of the carbon atoms attached directly to the amino nitrogen atoms.

These heterocyclic compounds are prepared by reacting a ketonitrile having the formula

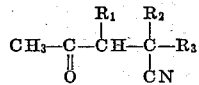

with a diprimary amine $NH_2QNH_2$, under conditions whereby ammonia and water are split out and removed. Usually this is done in the presence of an inert solvent that forms an azeotrope with water. Useful as solvent in this respect are benzene, toluene, xylene, heptane, hexane, methylene chloride, chloroform, and the like.

If the particular $NH_2QNH_2$ employed is insoluble in water, a large excess of the amine may be employed, as a solvent. The water is removed azeotropically as the reaction progresses, preferably at about 40° to 250° C. Alternatively, if $NH_2QNH_2$ is high boiling, the solvent can be dispensed with, and the combination of reactants merely heated at temperatures of 80 to 150° C. while water and ammonia are withdrawn. The reaction is desirably terminated after the substantially theoretical amount of water is removed. The product may be isolated by distillation, under reduced pressure if necessary, or recrystallized from a solvent, such as isooctane, as desired. If the diprimary amino compound has been used in excess to permit it to serve also as a solvent, it has to be separated from the product by conventional methods, such as distillation.

The heterocyclic compounds employed in the copolymer of this invention are made by reacting $NH_2QNH_2$ with the previously defined ketonitrile such as 4-oxopentanenitrile,
3-methyl-4-oxopentanenitrile,
2-butyl-4-oxopentanenitrile,
2,2-dimethyl-4-oxopentanenitrile,
2-methyl-2-ethyl-4-oxopentanenitrile,
2-methyl-2-(2,2,4,4-tetramethylpentyl)-4-oxopentanenitrile,
2-methyl-2-neopentyl-4-oxopentanenitrile,
2-phenyl-4-oxopentanenitrile,
2-benzyl-4-oxopentanenitrile,
2-cyclohexyl-4-oxopentanenitrile,
2-(4'-methylphenyl)-4-oxopentanenitrile,
2-acetyl-1-methylcyclopentanecarbonitrile,
3,3-dimethyl-2-(2-oxopropyl)-bicyclo-2.2.1 heptane-2-carbonitrile and
1-(2-oxopropyl) cyclohexanecarbonitrile.

Typical $NH_2QNH_2$ reactants are

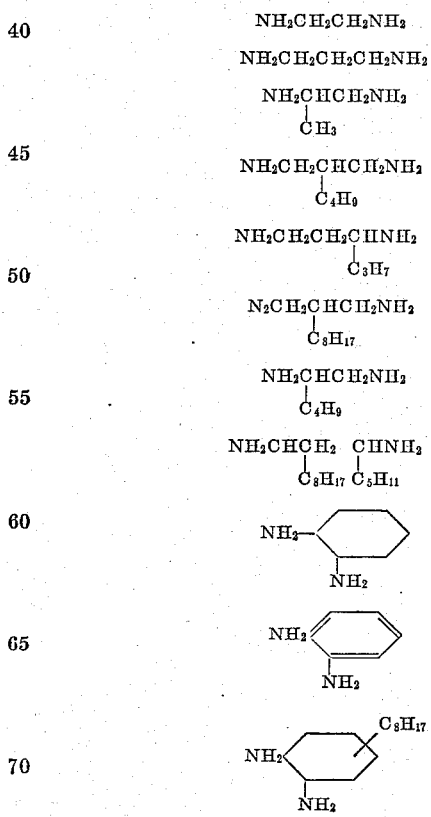

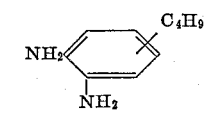

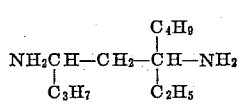

The heterocyclic compounds described hereinbefore may be copolymerized with monoethylenically unsaturated polymerizable monomers. These polymerizable monovinylidene monomers have the structure $CH_2=C<$ in many instances.

Suitable as comonomers are alkyl and aryl acrylates in which the alkyl or aryl portion contains preferably one to twenty-four carbon atoms; alkyl and aryl methacrylates in which the alkyl or aryl portion contains preferably one to twenty-four carbon atoms; acrylonitrile; methacrylonitrile; alkylaminoalkyl and dialkylaminoalkyl acrylates and methacrylates; acrylamide and methacrylamide, and their N-alkyl substituted derivatives; styrene and alkyl ring substituted styrenes containing no more than a total of about 20 carbon atoms; α-methylstyrene; allyl esters in which the carboxylate portion contains preferably two to eighteen carbon atoms; vinyl esters, in which the carboxylate portion contains one to eighteen carbon atoms, including the carbon of the carboxylate functions; vinyl alkyl ethers and vinyl alkyl sulfides in which the alkyl portion contains no more than 18 carbon atoms and N-vinyl lactams preferably containing from 6 to 20 carbon atoms; a compound having the formula

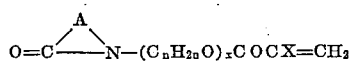

in which A is an alkylene group of three to twelve carbon atoms having three to five carbon atoms in a chain between the nitrogen and the carbonyl carbon atom, $x$ has a value of one to four, $n$ has a value of one to four such as N-vinyl oxazinidinones containing 4 to 6 carbon atoms in the cyclic structure, N-(acryloxyalkyl)-pyrrolidinones, N-(methacryloxyalkyl)-pyrrolidinones, N-(acryloxyalkyl)-oxazinidinones, N-(methacryloxyalkyl)-oxazinidinones; alkyl vinyl sulfones in which the alkyl portion contains up to 18 carbon atoms; N-vinyl-alkyleneureas containing from 5 to 12 carbon atoms; olefins such as isobutylene, dialkyl fumerates of up to 24 carbon atoms in each alkyl portion of the molecule; dialkyl maleates of up to 24 carbon atoms in each alkyl portion of the molecule; and dialkyl itaconates of up to 24 carbon atoms in each alkyl portion of the molecule; and vinylpyridines or lower alkyl substituted vinylpyridines. In the above monomers, the alkyl groups may exhibit any possible spatial configurations such as normal, iso, or tertiary, although normal alkyl groups may be acyclic or cyclic, including alkyl substituted cyclic, as long as the size of alkyl groups or the average size of alkyl groups in a mixture of polymerizable monomers is selected to ensure solubility of the final copolymer in oil in which it is to be used at the desired concentration. In the ring substituted styrenes the substituents may occupy any possible ring location or locations and when the substituents are alkyl groups, they may have any possible spatial configuration.

Typical of the above monomers that may be employed are

Methyl acrylate,
Ethyl acrylate,
Octyl acrylate,
Isopropyl acrylate,
Cyclopentyl acrylate,
2-ethylhexyl acrylate,
Decyl acrylate,
Iso-decyl acrylate,
Dodecyl acrylate,
Tridecyl acrylate,
Octadecyl acrylate,
Methyl methacrylate,
Ethyl methacrylate,
n-Butyl methacrylate,
tert-Butyl methacrylate,
δ-Chlorobutyl methacrylate,
Cyclohexyl methacrylate,
Octyl methacrylate,
Iso-decyl methacrylate,
Phenyl methacrylate,
Benzyl methacrylate,
Dimethylaminoethyl methacrylate,
Methoxyethoxyethyl methacrylate,
Methoxypolyethylene glycol methacrylate of about 425 to 818 in molecular weight,
Methoxyisopropoxyisopropyl methacrylate,
Dodecyl polyethylene glycol methacrylate with sufficient ethylene oxide units therein to give a molecular weight of about 1706,
t-Butylaminoethyl methacrylate,
t-Dodecylaminoethyl acrylate,
Octadecyl methacrylate,
Behenyl methacrylate,
Tetracosyl methacrylate,
Acrylonitrile,
Methacrylonitrile,
2-(ethylsulfinyl)-ethyl methacrylate,
N,N-dibutyl acrylamide,
Acrylamide,
N-methylacrylamide,
N-butyl methacrylamide,
Dimethylaminopropyl methacrylamide,
N-t-octylacrylamide,
Styrene,
p-Butylstyrene,
p-Octylstyrene,
o-Chlorostyrene,
o,p-Dipropylstyrene,
p-Cyanostyrene,
o-Methyl-p-decylstyrene,
N-vinyl succinimide,
Formamidoethyl vinyl ether,
Butanamidodecyl vinyl ether,
Acetamidooctadecyl vinyl ether,
Ureidoethyl vinyl ether,
Butyl vinyl sulfide,
Octyl vinyl sulfide,
Octadecyl vinyl sulfide,
Dimethylaminoethyl vinyl sulfide,
Diethylaminodecyl vinyl sulfide,
Morpholinopentyl vinyl sulfide,
Pyrrolidinyloctyl vinyl sulfide,
Piperidinodecyl vinyl sulfide,
N-vinyl-2-pyrrolidinone,
N-vinyl-5-methyl-2-pyrrolidinone,
N-vinyl-3-methyl-2-pyrrolidinone,
N-vinyl-4,4-diethyl-2-pyrrolidinone,
N-vinyl-4-butyl-5-octyl-2-pyrrolidinone,
N-(2-methacryloxyethyl)-2-pyrrolidinone,
N-(3-methacryloxypropyl)-2-pyrrolidinone,
N-vinyl-6-methyl-2-piperidone,
N-vinyl-6-octyl-2-piperidone,
N-vinyl-2,2,6,6-tetramethyl-4-piperidone,
N-vinyl-2-oxazinidinone,
N-vinyl-5-ethyl-2-oxazolidinone,
N-vinyl-5-methyl-2-oxazolidinone,
N-(2-methacryloxyethyl)-2-oxazolidinone,
N-vinyl-2-oxohexamethylenimine,
N-vinyl-5,5-dimethyl-2-oxohexamethylenimine,
N-vinyl-4-butyl-5-octyl-2-oxohexamethylenimine,
Methyl vinyl sulfone,
Isobutyl vinyl sulfone,
t-Octyl vinyl sulfone,
Dodecyl vinyl sulfone,
Octadecyl vinyl sulfone, N-vinylethyleneurea,
N-vinyltrimethyleneurea,
N-vinyl-1,2-propyleneurea,
N-vinylbutyleneurea,
N-vinyl-N'-dibutyl-aminododecylethyleneurea,
Isobutylene,
N-vinylcarbazole,
Vinyl acetate,
Vinyl stearate,
Dimethyl maleate,
Dioctyl maleate,
Dimethyl itaconate,
Dibutyl itaconate,
Dihexyl itaconate,
Dimethyl fumarate,
Diethyl fumarate,
Dioctyl fumarate,
Dibutyl fumarate,
Diisodecyl fumarate,
Didodecyl fumarate,
Dibutyl maleate,
Dihexyl maleate,
Didecyl maleate,
Diethyl itaconate,
Dioctyl itaconate,
Ditridecyl itaconate,
Didodecyl itaconate,
Distearyl itaconate,
4-Vinylpyridine and
2-Vinyl-5-methylpyridine.

It is understood that in many cases it will be preferred to combine more than one of the above comonomers with the heterocyclic monomer or monomers, as for example, dodecyl methacrylate and styrene, in order to achieve various modifications and properties in the product contemplated. It is, of course, necessary for the present purposes that the copolymers have oil solubility and, as will be apparent to one skilled in the art, the comonomers should be selected in order to impart this oil solubility.

Typical monomers that impart oil solubility include acrylates, methacrylates, itaconates, fumarates and maleates, in which the alcohol residue contains 6 to 24 carbon atoms. Particularly useful in this respect are octyl, nonyl, dodecyl, iso-decyl, iso-nonyl, tri-decyl, tetradecyl, octadecyl, phenyl, benzyl, cyclohexyl, and alkylphenyl acrylates and methacrylates, itaconates, maleates and fumarates.

Another useful type of starting material comprises vinyl esters of monocarboxylic acids. Here oil solubility can be controlled by the size of the hydrocarbon portion of the acid residue. If such ester or mixture of such esters is used to form the copolymer, it is usually desirable that the average group size be at least eight carbon atoms.

There may be also be employed with the monomers mentioned above, for the final copolymer, minor proportions of other monomers such as acrylic, methacrylic or itaconic acid, maleic anhydride, half esters of maleic, fumaric or itaconic acid, acrylamide, N-substituted acrylamides, methacrylamide, N-substituted methacrylamides, acrylonitrile, methacrylonitrile, vinyl esters of lower monocarboxylic acids, vinyl ethers, vinyl thioethers, vinyl ketones, vinyl chloride, vinylidene chloride.

It is preferred to employ the specific heterocyclic nitrogenous monomers of the present invention with an alkyl ($C_1$–$C_{18}$) methacrylate, alkyl ($C_1$–$C_{18}$) acrylate, acrylamide, acrylonitrile, dialkyl ($C_1$–$C_{18}$) fumarate, dialkyl ($C_1$–$C_{18}$) maleate, styrene or vinyl esters. While in most instances the copolymers of the present invention are prepared from a specific heterocyclic compound, with one of the other listed monomers, it is quite satisfactory for many uses to employ additional monomers as desired in order to arrive at desired properties in the final product.

One or more of the specific heterocyclic monomers may be used with one or more of the other stated monomers to form the valuable copolymers of this invention. The preferred heterocyclic nitrogenous monomers are those in which Q is ethylene, $R_1$ is hydrogen, $R_2$ is methyl and $R_3$ is alkyl of 1 to 10 carbon atoms.

The copolymers of the present invention may be prepared in a wide range of percentages of polymerizable monovinylidene compounds with the heterocyclic compound. The valuable properties described hereinbefore are observed when as little as 0.5% by weight of the heterocyclic nitrogenous monomer is employed, although it is generally preferably to use about 2% by weight or more of this monomer. As an upper limit there may be employed 50 mole percent of the heterocyclic nitrogenous monomer since said monomer does not homopolymerize.

Polymerization may be carried out in bulk when the monomers are liquids or low-melting solids, in solution, or in either suspension or emulsion. In bulk and solution polymerization, the reaction may be carried out without catalyst, initiated with light and heat, but it is preferred to use one or more of the peroxide or azo initiators which act as free radical catalysts, and are effective between 30° C. and 150° C. These may be employed in amounts of 0.01% to 10% or more by weight, preferably 0.01% to 1% by weight. Typical initiators include Benzoyl peroxide,
t-Butyl peroxide,
Acetyl peroxide,
Capryl peroxide,
t-Butyl hydroperoxide,
Cumene hydroperoxide,
t-Butyl perbenzoate,
Diisopropylbenzene hydroperoxide,
Triisopropylbenzene hydroperoxide,
Methyl cyclohexane hydroperoxide,
Ditertiary butyl peroxide,
Methylethyl ketone peroxide,
Azodiisobutylronitrile,
Azodiisobutyramide,
Dimethyl,
Diethyl, or
Dibutyl azodiisobutyrate,
Azobias($\alpha,\gamma$-dimethylvaleronitrile),
Azobias($\alpha$-methylbutyronitrile),
Azobias($\alpha$-methylvaleronitrile),
Dimethyl or
Diethyl azobis-$\alpha$-methylvalerate, and the like.

In conjunction with a hydroperoxide it is desirable, but not absolutely essential, to supply an activator. Its effect seems at least in part to provide free radicals at somewhat lower temperatures than are effective for free radical formation from hydroperoxides in the absence of such activator.

Especially effective as activators are quaternary ammonium compounds. Typical compounds of this sort are Benzyltrimethylammonium chloride,
Dibenzyldimethylammonium bromide,
Butyldimethylbenzylammonium chloride,
Octyltrimethylammonium chloride,
Dodecyldimethylbenzylammonium chloride,
Nonylbenzyltrimethylammonium chloride,
Dodecylbenzyldimethylbenzylammonium chloride,
Didodecenyldimethylammonium chloride,
Benzyldimethyldodecenylammonium chloride,
Octylphenoxyethyldimethylbenzylammonium chloride,
Diisobutylphenoxyethoxyethyldimethylbenzylammonium chloride,
Octylpyridinium chloride,
N-octyl-N-methyl-morpholinium chloride, or
Bis-quaternary salts, such as those having quaternary nitrogens linked with an ankylene group, an ether group, or an amide-containing group.

The amount of activator is proportioned to the amount of hydroperoxide. Usually, the proportion of quaternary ammonium compound will be from 5% to 40% of the weight of the hydroperoxide.

Solution polymerization may be carried out in kerosene, mineral oils, di-esters such as di(2-ethylhexyl)adipate or sebacate, chlorinated hydrocarbons, such as chloroform or ethylene chloride, tributylphosphate, dibutyl phenyl phosphate, silicate esters, or silicone fluids, benzene, toluene, xylene, solvent naphthas, dioxane, diisobutyl ketone, acetonitrile, dimethyl formamide, tert-butyl alcohol and the like, depending on the solubilities of the monomers it is desired to use.

Emulsion polymerization is particularly effective with those members of the heterocyclic series which have low solubilities in water. There may be used in forming the emulsion non-ionic or cationic emulsifiers such as dodecyldimethylbenzylammonium chloride, dodecylbenzyltrimethylammonium chloride, cetylpyridinium chloride, alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing 6 to 60 or more moles of ethylene oxide with nonyl, dodecyl, tetradecyl, t-dodecyl, and the like, mercaptans or with alkylthiophenols having alkyl groups of 6 to 15 carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monosterate containing 6 to 60 oxyethylene units; etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

In the case of emulsion polymerization especially, a redox catalyst system is extremly effective. This includes the use of an organic peroxide, such as benzoyl peroxide, acetyl peroxide, capryl peroxide, and the like, or an inorganic peroxide, such as hydrogen peroxide, ammonium persulfate, sodium persulfate, potassium persulfate, or the like. The peroxidic catalyst is effectively coupled with a reducing agent, such as a sulfite, bisulfite, metasulfite, or hydrosulfite of ammonium, sodium potassium or the like.

Polymerization may also be initiated by high-energy irradiation. Suitable sources of high energy-irradiation are radioactive materials and electron accelerators. Useful as radioactive materials that supply gamma rays are irradiated isotopes such as Co[60], fission products such as Cs[137], adjuncts to fission reactants such as radioactive xenon, and the like. A Co[60] source is particularly effective. Useful as radioactive materials that supply beta rays are Sr[90] and the like. Valuable as electron accelerators, which supply beta rays, are the Van de Graaff generator, the resonant transformer, and the like. Dosages in the range of 10,000 to 10,000,000 REP's, preferably 500,000 to 2,000,000 REP's, are employed. A REP is equivalent to the ionization produced by the absorption of 93 ergs of energy per gram of irradiated substance. REP stands for roentgen-equivalent-physical and is a unit of intensity and time.

The copolymerization of the monomers described hereinbefore may be conducted by mixing all of the monomers to be used at substantially the same time or one of the comonomers may be partially polymerized and then another comonomer or comonomers may be added at a later time either all at once or incrementally. The copolymer of the heterocyclic nitrogeneous monomer may also be prepared as a graft copolymer by carrying out the polymerization of the oil-solubilizing portion of the copolymer to about 40% to 90%, then adding the heterocyclic nitrogeneous monomer either alone or in combination with another monovinylidene polymerizable monomer, preferably but not necessarily, in the presence of a free-radical catalyst. The initiator and activator may be employed by incremental addition from time to time or all at once as desired. Generally the incremental addition is preferred.

The final copolymer may be taken up in a liquid such as a petroleum oil or synthetic lubricant, and a concentrate prepared in the range of about 10 to 60% of the copolymer. Volatile solvent and monomer may be volatilized from the mixture of copolymer and oil or synthetic lubricant. The concentrate is convenient for handling, stripping, and blending.

Copolymers may be prepared over a wide range of molecular weight by variations in temperature, time, catalyst and particular monomers contemplated. Molecular weights as determined by viscosity methods generally range from about 20,000 to 2,000,000 or more. Low molecular weights are especially desirable when the polymers are to be resistant to shear. The high molecular weight polymers are desired when maximum thickening and other optimum properties are required.

For purposes of determining the extent of copolymerization, there may conveniently be used a simple method which comprises isolating the copolymer from the reaction mixture, as by removal of a volatile solvent. Estimation of the extent of formation of the copolymer is particularly desirable in establishing the proper time of copolymerization for a given system in which proportions of initiator, concentrations, and temperatures are fixed.

In one useful form of test for extent of copolymerization, a one-gram sample of copolymerizing mixture is taken and dissolved in 5 ml. of benzene. The resulting solution is mixed with 15 ml. of methanol. Copolymer precipitates and is separated by centrifuging.

For purposes of determining the dispersancy characteristics of oil blends of the copolymer, a modified asphaltenes bench test known as the Shell Wood River Detergency test as described by S. K. Talley and R. G. Larsen in Industrial & Engineering Chemistry, Analytical Edition, 15, 91–95 (1943), was used.

The asphaltenes reagent used for these dispersion comparisons consists of the chloroform soluble, n-pentane insoluble material extracted from air oxidized napthenic oil (refrigerator oil) (72 hrs. at 175° C.). A trace of iron naphthenate is added as oxidation catalyst to the oil. The asphaltenes solution is finally adjusted to contain 2% solids in chloroform. The test consists of simply adding this reagent from a burette (usually 2 ml. per 10 ml. blend) to the test blend in a test tube and evaporating off the chloroform in forced draft oven at 150° C. for two hours. In most cases, 90° C. is used. After cooling the tubes for 30 to 45 mins., examination for separation of sludge is made with the aid of a flashlight and by tilting the tubes.

The oil test blend is considered passing the asphaltenes test provided a majority of the asphaltenes sludge remains suspended.

The compositions of the present invention include from about 0.1 to 10%, preferably 0.2 to 2.0% by weight, of a copolymer described hereinbefore, in a lubricating oil, automatic transmission fluid, hydraulic fluid, gear oil or grease. There may be used one or more other additives, such as anti-oxidants, anti-foam agents, anti-rust agents, anti-wear agents, heavy duty detergents, pour point depressants, viscosity index improvers, or other type of additive. For example, one or more of the dithiophosphates such as zinc dialkyl dithiophosphate, sulfurized oils, phenol sulfonates, or alkylaryl sulfonates or petroleum sulfonates whether normal or with alkaline reserve, polymers and copolymers from alkyl acrylates, methacrylates, itaconates, or fumarates or vinyl carboxylates and mixtures thereof; polybutenes, various silicones, alkyl or aryl phosphates, or many other oil additives may be present.

While a pour point depressant and a viscosity index improver may be added in addition to a copolymer of this invention, there may be used in place of such separate additives a copolymer of this invention which supplies not only dispersant action, but also one or both of these other actions. Thus, a copolymer which contains some alkyl groups of 16 or more carbon atoms, particularly cetyl or stearyl, together with smaller groups, such as myristyl, lauryl, or octyl, will lower the pour point of oils having a waxy pour point and at the same time improve temperature-viscosity relationships. Improvements in viscosity index can be emphasized by the choice of substitutents and such improvements can be had without lowering of pour point if this is desired. The lubricating oils contemplated include both the mineral and synthetic types.

A turbo prop lubricant may be prepared by blending the copolymers of this invention with di-2-ethylhexyl sebacate and a mixture of polyesters formed by condensing 2-ethyl-1,3-hexanediol and sebacic acid into the polyesters with 2-ethylhexanol, there being an average of about three glycol units per molecule. This composition may also contain antioxidant, stabilizer, or other usual additive.

Copolymers of this invention may also be used in fuel oils of various types, including furnace oils, kerosene, gasolines and jet fuels. Concentrations of copolymers from about 0.001% to 0.1% by weight are usually sufficient to disperse gum or resins which may form during storage, thereby preventing deposits of gum and resins on the walls of containers or pipes or on screens.

*Example 1*

A 500 cc. round bottom, 3-necked flask was equipped with a gas inlet tube, a bulb reflux condenser, a power-driven glass semi-circular stirrer and an addition funnel. The reaction was carried out under a blanket of nitrogen and the temperature was maintained by a controlled electrically heated oil bath.

The following catalyzed monomer mixture was prepared consisting of 95 parts lauryl-myristyl methacrylate, 5 parts 7,7 - dimethyl - 5 - methylene -2,3,5,6- tetrahydro-[7H]-pyrrolo(1,2-a)-imidazole, 5 parts of toluene and 0.3 part of a 50% solution of diisopropylbenzene hydroperoxide. Lauryl-myristyl methacrylate is the methacrylate ester prepared from a commercial alcohol which analyzed 4% n-decanol, 66.4% n-dodecanol, 27.2% tetradecanol and 2.4% hexadecanol. Thirty percent of the above catalyzed monomer mixture was added to the polymerization flask with 0.06 part of a 25% solution of diisobutylphenoxyethoxyethylbenzyldimethyl-ammonium chloride monohydrate. The time was considered 0.00 hour. The batch temperature was maintained at 110° C. for the first 5.75 hours. After 0.33 hour the remaining catalyzed monomer mixture was added to the flask over 1.67 hours. An addition of 0.06 part of a 50% solution of diisopropylbenzene hydroperoxide and 0.01 part of a 25% solution of diisobutylphenoxyethoxyethylbenzyldimethylammonium chloride monohydrate was added at 2.67 hours. Additions of 0.09 part of a 50% solution of diisopropylbenzene hydroperoxide and 0.018 part of a 25% solution of diisobutylphenoxyethoxyethylbenzyldimethylammonium chloride monohydrate were added at 4.00, 4.67, 5.33, 5.67 and 7.92 hours, respectively. It is to be noted that at 5.75 hours, the reaction was cooled and heating was continued after a delay of 16.25 hours (overnight) at a temperature of 105° C.

At 9.92 hours, 40 parts of toluene were added and the reaction was cooled. The resulting toluent solution was 56.5% copolymer, representing a copolymerization yield of 79.5%. When tested for dispersancy characteristics, 0.125% copolymer was found to disperse 0.2% asphaltenes in a mineral oil test blend at 90° C. The viscosity of a toluene solution, 30% copolymer, at 100° F. was 96.9 centistokes.

To a stripping flask was charged 31.2 parts of the toluene solution containing 17.6 parts of copolymer with 15 parts of di-2-ethylhexyl sebacate. This mixture was heated with stirring to 130° C. under 5 mm. of mercury for one hour to give 35.5 parts of product which was diluted with an additional 23.2 parts of di-2-ethylhexyl sebacate. This concentrate was tested as a thickener and viscosity index improver. The original blend containing 30% of the above copolymer had a viscosity of 140 centistokes at 210° F.

| Wt. percent of above copolymer in di-2-ethylhexyl sebacate | Viscosity, cs. | | Viscosity Index | |
|---|---|---|---|---|
| | 210° F. | 100° F. | Dean-Davis | Extended VI |
| 0 | 3.31 | 12.70 | 151 | 148 |
| 1.5 | 4.71 | 17.84 | 190 | 215 |
| 3 | 6.39 | 24.30 | 180 | 253 |
| 6 | 10.76 | 41.53 | 167 | 277 |

The above viscosity index values were determined by ASTM methods. The Dean-Davis column referring to the standard ASTM-D-567 method and Extended VI column refers to a proposed test recommended by a special ASTM committee studying viscosity temperature relationships.

The above copolymer was evaluated in a base oil that had an ASTM pour point of 0° F., a viscosity index of 98, a viscosity at 210° F. of 4.06 centistokes and at 100° F. of 21.23 centistokes. This base oil gave no observable asphaltene dispersancy at 90° C. A blend of the base oil was made with 30% of the copolymer of the present invention giving a viscosity at 210° F. of 156 centistokes. Blends of the above copolymer in the base oil were made at 1% and 2% by weight. At 1% of the above copolymer in the base oil the viscosity index was 133 and the viscosity was 26.04 centistokes at 100° F. and 5.01 centistokes at 210° F. At 2% of the copolymer a viscosity index of 146 was obtained. It had a viscosity of 6.16 centistokes at 210° F. and 31.75 centistokes at 100° F. At both concentrations an ASTM pour point of −50° F. was determined. This copolymer dispersed 0.2% of asphaltenes at 90° C. when used in the amount of 0.125% by weight.

There was similarly prepared in similar amounts a copolymer of 3,6 - dimethyl - 5-methylene-2,3,5,6-tetrahydro-[7H]-pyrrolo(1,2-a)imidazole having the structure:

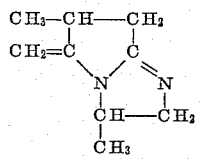

and lauryl-myristyl methacrylate which had the same asphaltene dispersancy activity and gave a viscosity in a 1% solution in the above-described base oil of 135.

*Example 2*

A 500 cc. flask was fitted as for Example 1. The following catalyzed monomer mixture was prepared consisting of 85 parts lauryl-myristyl methacrylate, 15 parts, 7,7 - dimethyl - 5 - methylene - 2,3,5,6-tetrahydro-[7H]-pyrrolo(1,2-a)imidazole, 5 parts toluene and 0.3 part of a 50% solution of diisopropylbenzene hydroperoxide.

Thirty percent of the above catalyzed monomer mixture was added to the reaction flask with 0.06 part of a 25% solution of diisobutylphenoxyethoxyethylbenzyldimethylammonium chloride monohydrate. For the remainder of the copolymerization cycle, an identical process with temperatures as described for Example 1 were used. The resulting toluene solution was 55.1% of copolymer, representing a copolymerization yield of 77.2%. When tested for dispersancy, 1.0% copolymer was found to disperse 0.2% asphaltenes in an oil test blend at 90° C. The viscosity of a toluene solution, 30% copolymer, at 100° F. was 47.7 centistokes.

The above copolymer was evaluated in a base oil that had an ASTM pour point of 0° F., a viscosity index of 98, a viscosity at 210° F. of 4.06 centistokes and at 100° F. of 21.23 centistokes. This base oil gave no observable asphaltene dispersancy at 90° C. A blend of the base oil was made with 30% of the copolymer of the present invention giving a viscosity at 210° F. of 95.8 centistokes. Blends of the above copolymer in the base oil were made at 1% and 2% by weight. At 1% of the above copolymer in the base oil the viscosity index was 122 and the viscosity was 24.54 centistokes at 100° F. and 4.67 centistokes at 210° F. At 2% of the copolymer a viscosity index of 138 was obtained. It had a viscosity of 5.42 centistokes at 210° F. and 28.36 centistokes at 100° F. The 1% blend had an ASTM pour point of —50° F. and the 2% blend an ASTM pour point of —55° F. A 1% blend dispersed 0.2% of asphaltenes at 90° C.

In an analogous way using analogous amounts there was prepared a copolymer of lauryl-myristyl methacrylate and 7 - methyl - 7-nonyl-5-methylene-2,3,5,6-tetrahydro - [7H] - pyrrolo-(1,2-a)imidazole which had the same asphaltene dispersancy properties and gave a viscosity index in a 1% blend of the above-described base oil of 136.

*Example 3*

A 500 cc. flask was fitted as for Example 1. The following catalyzed monomer mixture was prepared consisting of 90 parts lauryl methacrylate, 10 parts 7,7-dimethyl - 5 - methylene - 2,3,5,6-tetrahydro-[7H]-pyrrolo (1,2-a)imidazole, 10 parts toluene and 0.2 part α,α'-azodiisobutyronitrile. Thirty percent of the above catalyzed monomer mixture was added to the reaction flask. The time was considered 0.00 hour when the batch temperature reached 110° C. This temperature was maintained during the entire polymerization cycle. After 0.33 hour the remaining catalyzed monomer mixture was added over 1.67 hours. An addition of 0.04 part α,α'-azodiisobutyronitrile in 5 parts toluene was made at 2.67 hours. Additions of 0.06 part α,α'-azodiisobutyronitrile in 5 parts toluene were made at 4.00, 4.65, 5.33, and 6 hours, respectively. The heating was stopped at 6.50 hours. The copolymer wos diluted with 200 parts of toluene and the resulting toluene solution was 28.6% copolymer, representing a copolymerization yield of 89.8%. When tested for dispersancy 0.063% copolymer was found to disperse 0.2% asphaltenes in an oil test blend at 90° C. The viscosity of a toluene solution, 28.6% copolymer, at 100° F. was 38.6 centistokes.

In a similar way using similar amounts there was prepared a copolymer of lauryl methacrylate with 5-methylene - 3 - octyl - 7 - phenyl-2,3,5,6-tetrahydro-[7H]-pyrrolo(1,2-a)imidazole which had the same asphaltene dispersancy characteristics.

*Example 4*

A 1,000 cc. flask was fitted as for Example 1. The following catalyzed monomer mixture was prepared consisting of 75 parts lauryl-myristyl methacrylate, 20 parts methyl acrylate, 5 parts 7,7-dimethyl-5-methylene-2,3,5,6-tetrahydro-[7H]-pyrrolo(1,2-a)imidazole and 0.4 part of a 50% solution of diisopropylbenzene hydroperoxide. Thirty percent of the above catalyzed monomer mixture was added to the reaction flask with 0.02 part diisobutylphenoxyethoxyethylbenzyldimethylammonium chloride monohydrate. The time was considered 0.00 hour when the batch temperature reached 110° C. During the copolymerization cycle, the temperature ranged from 110 to 115° C. After 0.33 hour the remaining catalyzed monomer mixture was added to the reaction flask over 1.67 hours. An additional 0.08 part of a 50% solution of diisopropylbenzene hydroperoxide and 0.004 part diisobutylphenoxyethoxyethylbenzyldimethylammonium chloride monohydrate were made at 4.00, 4.67, 5.33 and 6 hours, respectively. At 6.67 hours, 100 parts of toluene were added. Heating was stopped at 6.92 hours. The resulting toluene solution was 44.7% copolymer, representing a copolymerization yield of 89.2%. When tested for dispersancy 1.0% copolymer was found to disperse 0.2% asphaltenes in an oil test blend at 90° C.

To 544.5 grams of the toluene solution, 44.7% copolymer, was added 160 grams of 100 SUS neutral oil and the mixture was stripped for 2 hours at 140° C. at 5 mm. of Hg. To the resulting oil solution was added enough 100 SUS oil to make the solution 30% copolymer. The viscosity of this oil solution at 210° F. was 152 centistokes. When tested for dispersancy 1.0% copolymer was found to disperse 0.2% asphaltenes in an oil test blend at 90° C.

The above copolymer was evaluated in a base oil that had an ASTM pour point of 0° F., a viscosity index of 98, a viscosity at 210° F. of 4.06 centistokes and at 100° F. of 21.23 centistokes. This base oil gave no observable asphaltene dispersancy at 90° C. A blend of the base oil was made with 30% of the copolymer of the present invention giving a viscosity at 210° F. of 152 centistokes. Blends of the above copolymer in the base oil were made at 1% and 2% by weight. At 1% of the above copolymer in the base oil the viscosity index was 128 and the viscosity was 23.62 centistokes at 100° F. and 4.62 centistokes at 210° F. At 2% of the copolymer a viscosity index of 144 was obtained. It had a viscosity of 5.36 centistokes at 210° F. and 26.87 centistokes at 100° F. At both concentrations an ASTM pour point of —30° F. was determined. This copolymer dispersed 0.2% of asphaltenes at 90° C. when used in the amount of 0.125% by weight.

In a similar manner and in similar amounts there was prepared a copolymer of lauryl-myristyl methacrylate, methyl acrylate and the hexahydropyrrolopyrimidine of the structure:

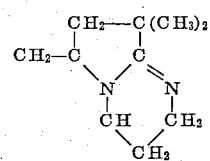

which gave the same asphaltene dispersancy activity. This copolymer was blended with the above-described base oil. A 2% by weight blend of copolymer in the base oil gave a viscosity index of 147.

*Example 5*

A 500 cc. flask was fitted as for Example 1. This copolymerization was carried out using the same monomers, the same monomer ratios, catalyst additions and time schedules as for Example 4, except tertiary butyl perbenzoate was used instead of diisopropylbenzene hydroperoxide and no diisobutylphenoxyethoxyethylbenzyldimethylammonium chloride monohydrate was used. The batch temperature was maintained at 125 to 127° C. during the copolymerization cycle. The resulting toluene solution was 43.6% copolymer representing a copolymerization yield of 78.9%. The viscosity of a toluene solution, 30% copolymer, was found to be 44.6 centistokes at 100° F. When tested for dispersancy 0.5% copolymer was found to disperse 0.2% asphaltenes in an oil test blend at 90° C.

Example 6

A 500 cc. flask was fitted as for Example 1. The following catalyzed monomer mixture was prepared consisting of 79 parts lauryl-myristyl methacrylate, 20 parts methyl acrylate, 1 part 7,7-dimethyl-5-methylene-2,3,5,6-tetrahydro-[7H]-pyrrolo(1,2-a)imidazole and 0.4 part of a 50% solution of tertiary-butyl perbenzoate. Thirty percent of the above catalyzed monomer mixture was charged to the flask and heated to 110° C. An exotherm carried the temperature to 145° during the first 0.33 hour. Beginning at 0.33 hour, the rest of the catalyzed monomer mixture was added over 1.67 hours and the batch temperature was lowered to 120° C. during this time. An addition of 0.08 part of a 50% solution of tertiary-butyl perbenzoate was made at 2.67 hours. Additions of 0.12 part of a 50% solution of tertiary-butyl perbenzoate were made at 4.00, 4.67, 5.33 and 6.00 hours, respectively. Fifty parts of toluene were added at 6.00 hours. The reaction was stopped at 6.67 hours. The resulting toluene solution was 46.0% copolymer, representing a copolymerization yield of 85.6%. The viscosity of a toluene solution, 30% copolymer, was 274.6 centistokes at 100° F. When tested for dispersancy 0.063% copolymer was found to disperse 0.2% asphaltenes in an oil test blend at 90° C.

To 50 gm. of the toluene solution, 46% copolymer, was added 30 gm. of 100 SUS neutral oil and this mixture was stripped for 2 hours at 140° C. at 5 mm. of Hg. To the resulting oil solution was added enough 100 SUS neutral oil to make a concentrate, 30% copolymer. The viscosity of this concentrate was 437 centistokes at 210° F.

Th above copolymer was evaluated in a base oil that had an ASTM pour point of 0° F., a viscosity index of 98, a viscosity at 210° F. of 4.06 centistokes and at 100° F. of 21.23 centistokes. This base oil gave no observable asphaltene dispersancy at 90° C. A blend of the base oil was made with 30% of the copolymer of the present invention giving a viscosity at 210° F. of 437 centistokes. Blends of the above copolymer in the base oil were made at 1% and 2% by weight. At 1% of the above copolymer in the base oil the viscosity index was 148 and the viscosity was 26.58 centistokes at 100° F. and 5.41 centistokes at 210° F. At 2% of the copolymer a viscosity index of 158 was obtained. It had a viscosity of 7.15 centistokes at 210° F. and 33.71 centistokes at 100° F. The 1% blend had an ASTM pour point of −20° F. and the 2% blend an ASTM pour point of −30° F. This copolymer gave an asphaltene dispersancy of 0.2% of asphaltenes at 90° C. when used in the concentration of 0.063%.

Example 7

A 500 cc. flask was fitted as for Example 1. The following catalyzed monomer mixture was prepared consisting of 72 parts lauryl methacrylate, 25 parts methyl acrylate, 3 parts 7,7-dimethyl-5-methylene-2,3,5,6-tetrahydro-[7H]-pyrrolo(1,2-a)-imidazole and 0.2 part of a 50% solution of tertiary-butyl perbenzoate. Five percent of the above catalyzed monomer mixture was charged to the flask. After 0.33 hour the remaining catalyzed monomer mixture was added to the flask. The batch temperature was maintained at 120° C. At 2.67 hours an addition of 0.04 part of a 50% solution of tertiary-butyl perbenzoate was made. Additions of 0.06 part of a 50% solution of tertiary-butyl perbenzoate were made at 4.00, 4.67, 533 and 6.00 hours, respectively. At 6.67 hours 100 parts of toluene were added. Heating was stopped at 6.75 hours. The resulting toluene solution was 37.5% copolymer, representing a copolymerization yield of 68%. When tested for dispersancy 0.5% copolymer was found to disperse 0.2% asphaltenes in an oil test blend at 90° C.

In a similar way using similar amounts there was prepared a copolymer of lauryl-myristyl methacrylate, acrylate and 5-methylene-7,7-diethyl-2,3,5,6-tetrahydro-[7H]-pyrrolo(1,2-a)-imidazole which had the same dispersancy characteristics.

Example 8

A 500 cc. flask was fitted as for Example 1. The following catalyzed monomer mixture was prepared consisting of 79.5 parts lauryl-myristyl methacrylate, 20.0 parts methyl acrylate, 0.5 part 7,7-dimethyl-5-methylene-2,3,5,6-tetrahydro-[7H]-pyrrolo(1,2-a)imidazole and 0.4 part of a 50% solution of tertiary-butyl perbenzoate. Five percent of the above catalyzed monomer mixture was added to the flask. The temperature was maintained at 120° C. The time was considered 0.00 hour. Beginning at 0.33 hour, the remaining catalyzed monomer mixture was added over 1.67 hours. At 2.67 hours an addition of 0.08 part of a 50% solution of tertiarybutyl perbenzoate was made. Additions of 0.12 part of a 50% solution of tertiary-butyl perbenzoate were made at 4.00, 4.67, 5.33 and 6.00 hours, respectively. Also at 6.00 hours, 25 parts of toluene was added. Heating was terminated at 6.67 hours An additional 100 parts of toluene was added before analysis. The resulting toluene solution was 37.2% copolymer, representing a copolymerization yield of 85.8%. The viscosity of a toluene solution, 30% copolymer, at 100° F. was 1068.9 centistokes. When tested for dispersancy 0.125% copolymer was found to disperse 0.2% asphaltenes in an oil test blend at 90° C.

Example 9

A 500 cc. flask was fitted as for Example 1. The following catalyzed monomer mixture was prepared consisting of 69 parts lauryl-myristyl methacrylate, 30 parts ethyl acrylate, 1 part 7,7-dimethyl-5-methylene-2,3,5,6-tetrahydro-[7H]-pyrrolo(1,2-a)-imidazole and 0.4 part of a 50% solution of tertiary-butyl perbenzoate. Thirty percent of the above catalyzed monomer mixture was charged to the flask. The time was considered 0.00 hour. Starting at 0.33 hour, the remaining catalyzed monomer mixture was added over 1.67 hours. The batch temperature was maintained between 110 to 115° C. An addition of 0.08 part of a 50% solution of tertiary-butyl perbenzoate in 4.33 parts toluene was made at 2.67 hours. Additions of 0.12 part of a 50% solution of tertiarybutyl perbenzoate in 4.33 parts toluene were made at 4.00, 4.67, 5.33 and 6.00 hours, respectively. At 6.67 hours, 43.3 parts of toluene was added. Heating was terminated at 7.17 hours. The resulting toluene solution was 46.3% copolymer. When tested for dispersancy 0.25% copolymer was found to disperse 0.2% asphaltenes in an oil test blend at 90° C.

In a similar fashion, 5-methylene-5,6-dihydro-[7H]-pyrrolo(1,2-a)-2,3-benzimidazole, having the following structure:

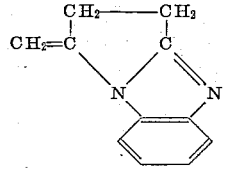

was used in place of 7,7-dimethyl-5-methylene-2,3,5,6-tetrahydro-[7H]-pyrrolo(1,2-a)imidazole to give a corresponding copolymer which showed the same characteristic dispersant properties.

Example 10

A 500 flask was fitted as for Example 1. The following catalyzed monomer mixture was prepared consisting of 48.5 parts lauryl-myristyl methacrylate, 48.5 parts di-(lauryl-myristyl)-fumarate, 3 parts, 7,7-dimethyl-5-methylene - 2,3,5,6 - tetrahydro - [7H] - pyrrolo (1,2-a)imidazole, 25 parts toluene and 1 part α,α'-azodiisobutyronitrile. Thirty percent of the catalyzed monomer mixture was charged to the flask. The time was considered 0.00 hour when the batch temperature reached 90° C. This temperature was maintained during the entire process. After 0.33 hour the remaining catalyzed monomer mixture was added to the flask over 1.67 hours. An addition of 0.2 part, α,α′-azodiisobutyronitrile in 5 parts toluene was made at 2.67 hours. Additions of 0.3 part α,α′-azodiisobutyronitrile in 5 parts toluene were made at 4.00, 4.67, 5.33 and 6.00 hours, respectively. At 6.5 hours, 50 parts of toluene was added. Heating was terminated at 7.00 hours. The resulting toluene solution was 46.0% copolymer, representing a copolymerization yield of 89.2%. When tested for dispersancy 0.25% copolymer was found to disperse 0.2% asphaltenes in an oil test blend at 90° C.

The viscosity of a blend of 30% of the above copolymer in 100 SUS oil was 12.25 centistokes at 210° F. The above copolymer was blended with a 110 SUS neutral oil that had a viscosity index of 100. A 1% blend of the copolymer had a viscosity index of 108 and a viscosity of 5.77 centistokes at 210° F. and 37.62 centistokes at 100° F. A 2% blend of this copolymer had a viscosity index of 109 and a viscosity of 5.88 centistokes at 210° F. and 37.53 centistokes at 100° F. This copolymer dispersed 0.2% of asphaltenes at 90° C. when used in the amount of 0.25% by weight.

In a similar manner using similar amounts there was made a copolymer of lauryl-myristyl methacrylate, di-(lauryl-myristyl) fumarate and 2-methyl-5-methylene-2,3,5,5a,6,7,8,9-octahydro(9aH)-pyrrolo [1,2-a] imidazole. This copolymer had the same asphaltene dispersancy activity as the copolymer of lauryl-myristyl methacrylate, di-(lauryl-myristyl)fumarate and 7,7-dimethyl - 5 - methylene - 2,3,5,6 - tetrahydro - [7H]-pyrrolo(1,2-a)imidazole and gave a viscosity index in a 1% blend in the above-described base oil of 112.

*Example 11*

A 500 cc. flask was fitted as for Example 1. The following catalyzed monomer mixture was prepared consisting of 95 parts lauryl acrylate, 5 parts 7,7-dimethyl- 5 - methylene - 2,3,5,6 - tetrahydro - [7H] - pyrrolo(1,2-a)imidazole, 25 parts toluene and 0.08 parts α,α′-azodiisobutyronitrile. Thirty percent of the catalyzed monomer mixture was charged to the flask. The time was considered 0.00 hour when the batch temperature reached 90° C. This temperature was maintained during the entire process. After 0.33 hour the remaining catalyzed monomer mixture was added to the reaction flask over 1.67 hours. An addition of 0.032 part of α,α′-azodiisobutyronitrile was made at 2.67 hours. Additions of 0.048 part α,α′-azodiisobutyronitrile were made at 4.00, 4.67, 5.33 and 6.00 hours, respectively. Heating was terminated at 6.5 hours. The resulting toluene solution was 70.6% copolymer, representing a copolymerization yield of 96.3%. When tested for dispersancy 0.25% copolymer was found to disperse 0.2% asphaltenes in an oil test blend at 90° C.

To a stripping flask was charged 30.0 parts of the toluene solution, 70.6% copolymer, and 49.2 parts 100 SUS neutral mineral oil. This mixture was heated with stirring to 130° C., under 5 mm. of mercury for one hour to give 70.6 parts of product stripped. This oil solution was 30.0% copolymer and showed a viscosity of 35.7 centistokes at 210° F.

The above copolymer was evaluated in a base oil that had an ASTM pour point of 0° F., a viscosity index of 98, a viscosity at 210° F. of 4.06 centistokes and at 100° F. of 21.23 centistokes. This base oil gave no observable asphaltene dispersancy at 90° C. A blend of the base oil was made with 30% of the above copolymer of the present invention giving a viscosity at 210° F. of 35.7 centistokes. Blends of the above copolymer in the base oil were made at 1% and 2% by weight. At 1% of the above copolymer in the base oil the viscosity index was 112 and the viscosity was 23.19 centistokes at 100° F. and 4.40 centistokes at 210° F. At 2% of the copolymer a viscosity index of 126 was obtained. It had a viscosity of 4.82 centistokes at 210 °F. and 25.38 centistokes at 100° F. At 1% of the copolymer the ASTM pour point was —20° F. At 2% it was —10° F. This copolymer dispersed 0.2% of asphaltenes at 90° C. when used in the amount of 0.25% by weight.

In a similar way using similar amounts there was prepared a copolymer consisting of lauryl acrylate and 6 - methylene - 2,3,4,6,6a,7,8,9,10,10a - dichloropyrrolo[1, 2-a]pyrimidine. This copolymer dispersed 0.2% asphaltenes at 90° C. when used in the amount of 1% by weight. It had a viscosity index in the 2% blend of 133.

*Example 12*

A 500 cc. flask was fitted as for Example 1. The following catalyzed monomer mixture was prepared consisting of 48.5 parts vinyl stearate, 48.5 parts vinyl butyrate, 3 parts 7,7-dimethyl-5-methylene-2,3,5,6-tetrahydro-[7H]-pyrrolo[1,2-a]-imidazole, 10 parts toluene and 1 part α,α′-azodiisobutyronitrile. Thirty percent of the catalyzed monomer mixture was charged to the flask. The time was considered 0.00 hour when the batch temperature reached 85° C. This temperature was maintained during the entire process. After 0.33 hour the remaining catalyzed monomer mixture was added to the reaction flask over 1.67 hours. An addition of 0.2 part α,α′-azodiisobutyronitrile was made at 2.67 hours. Additions of 0.3 part α,α′-azodiisobutyronitrile were made at 4.00, 4.67, 5.33 and 6.00 hours, respectively. Heating was terminated at 6.5 hours. After dilution with 21.5 parts toluene the resulting solution was 55.2% copolymer, representing a copolymerization yield of 79.6%. When tested for dispersancy 0.25% copolymer was found to disperse 0.2% asphaltenes in an oil test blend at 90° C.

To a stripping flask was charged 30.0 parts of the toluene solution, and 34.6 parts 100 SUS neutral oil. This mixture was heated with stirring to 130° C., under 5 mm. of mercury for one hour to give 55.2 parts of product. This oil solution was 30.0% copolymer and showed a viscosity of 38.5 centistokes at 210° F.

The above copolymer was evaluated in a base oil that had an ASTM pour point of 0° F., a viscosity index of 98, a viscosity at 210° F. of 4.06 centistokes and at 100° F. of 21.23 centistokes. This base oil gave no observable asphaltene dispersancy at 90° C. A blend of the base oil was made with 30% of the copolymer of the present invention giving a viscosity at 210° F. of 38.5 centistokes. Blends of the above copolymer in the base oil were made at 1% and 2% by weight. At 1% of the above copolymer in the base oil the viscosity index was 112 and the viscosity was 22.65 centistokes at 100° F. and 4.34 centistokes at 210° F. At 2% of the copolymer a viscosity index of 126 was obtained. It had a viscosity of 4.69 centistokes at 210° F. and 24.35 centistokes at 100° F. At both concentrations an ASTM pour point of 0° F. was obtained. This copolymer dispersed 0.2% of asphaltenes at 90° C. when used in the amount of 0.25% by weight.

In a similar way using similar amounts there was prepared a copolymer of vinyl stearate, vinyl butyrate, and 6 - methylene - 8,8 - dimethyl - 2,3,4,6,7,8 - hexahydropyrrolo[1,2-a]pyrimidine. This copolymer had a viscosity index in a 2% blend of 129. It dispersed 0.2% of asphaltenes at 90° C. when used in the amount of 0.50% by weight.

*Example 13*

A 500 cc. flask was fitted as for Example 1. The following catalyzed monomer mixture was prepared consisting of 70.0 parts di-(isodecyl)fumarate, 20 parts toluene and 0.7 part α,α′-azodiisobutyronitrile. Thirty percent of the catalyzed monomer mixture was charged to the flask. The time was considered 0.00 hour when the batch temperature reached 85° C. This temperature was maintained during the entire copolymerization process. After 0.33 hour the remaining catalyzed monomer mixture was added to the reaction flask over 1.67 hours. An additional catalyzed monomer mixture was prepared consisting of 25 parts vinyl acetate, 5 parts 7,7-dimethyl-5-methylene-2,3,5,6-tetrahydro-[7H]-pyrrolo[1,2-a]imidazole and 0.3 part α,α'-azodiisobutyronitrile. This second catalyzed monomer mixture was added to the flask from 2.25 hours until 3.00 hours. An addition of 0.2 part α,α'-azodiisobutyronitrile was made at 3.67 hours. Additions of 0.3 part α,α'-azodiisobutyronitrile were made at 5.00, 5.67, 6.33 and 7.00 hours, respectively. Heating was terminated at 7.5 hours. The resulting toluene solution was 77.6% copolymer, representing a copolymerization yield of 90%. When tested for dispersancy 2.0% copolymer was found to disperse 0.2% asphaltenes in an oil test blend at 90° C.

To a stripping flask was charged 20.0 parts of the toluene solution, 77.6% copolymer, and 36.1 parts 100 SUS neutral mineral oil. This mixture was heated with stirring to 130° C., under 5 mm. of mercury for one hour to give 51.6 parts of product. This stripped oil solution was 30.0% copolymer and showed a viscosity of 15.5 centistokes at 210° F.

The above copolymer was evaluated in a base oil that had an ASTM pour point of 0° F., a viscosity index of 98, a viscosity at 210° F. of 4.06 centistokes and at 100° F. of 21.23 centistokes. This base oil gave no observable asphaltene dispersancy at 90° C. A blend of the base oil was made with 30% of the above copolymer giving a viscosity at 210° F. of 15.5 centistokes. Blends of the above copolymer in the base oil were made at 1% and 2% by weight. At 1% of the above copolymer in the base oil the viscosity index was 101 and the viscosity was 22.23 centistokes at 100° F. and 4.20 centistokes at 210° F. At 2% of the copolymer a viscosity index of 106 was obtained. It had a viscosity of 4.36 centistokes at 210° F. and 23.27 centistokes at 100° F. At both concentrations an ASTM pour point of 0° F. was determined. This copolymer dispersed 0.2% of asphaltenes at 90° C. when used in the amount of 2% by weight.

*Example 14*

A solution consisting of 1 part of di-isobutyl fumarate, 1 part of 7,7-dimethyl-5-methylene-2,3,5,6-tetrahydro-[7H]-pyrrolo(1,2-a)imidazole and 0.002 part of azoisobutyronitrile is heated for 24 hours under nitrogen at 70° C. The mixture upon cooling to room temperature barely flows. The mixture is soluble in oils and small percentages (1% and less by weight) prevent the deposition of asphaltenes at 90° C.

*Example 15*

A solution of 4 parts of di-n-butyl itaconate, 4 parts of 7,7-dimethyl-5-methylene-2,3,5,6-tetrahydro-[7H]-pyrrolo(1,2-a)imidazole and 0.08 part of azoisobutyronitrile is heated at 70° under nitrogen for 24 hours. A copolymer forms which is a clear yellow color. This copolymer in amounts of 1% and less by weight disperses 0.2% of asphaltenes at 90° C.

In a similar manner, 7-methyl-7-sec-nonyl-5-methylene-2,3,5,6-tetrahydro-[7H]pyrrolo(1,2-a)imidazole and dioctyl fumarate give a viscous oil. This oil is soluble in gasoline, which it stabilizes from gum formation. It also serves to protect metal surfaces in contact with the gasoline.

*Example 16*

A mixture is made of 15 parts of cetyl methacrylate, 3.0 parts of 7,7-dimethyl-5-methylene-2,3,5,6-tetrahydro-[7H]-pyrrolo(1,2-a)imidazole and 5 parts of hexyl acrylate. There is added 0.01 part of azodiisobutyronitrile, and the mixture is heated for 12 hours at 80° in a nitrogen atmosphere. The viscous oil which results is soluble in heating and lubricating oils. This copolymer in an oil blend disperses 0.2% of asphaltenes at 90° C. when employed in amounts of 1% by weight.

*Example 17*

In 100 parts of di-2-ethylhexyl sebacate there is dissolved 50 parts of n-butyl methacrylate, one part of 2-N-tert. butylaminoethyl methacrylate, one part of 7,7-dimethyl-5-methylene-2,3,5,6-tetrahydro - [7H] - pyrrolo(1,2-a)imidazole and 0.01 part of azodiisobutyronitrile. The mixture is heated for 16 hrs. at 70° C. There is obtained a viscous solution of the terpolymer, which is useful as a synthetic lubricant when used at desired concentration levels of copolymer.

50 parts of sec. butyl methacrylate, and two parts of the hexahydropyrrolopyrimidine of the structure:

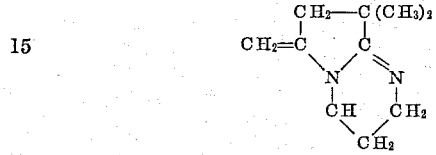

with 0.01 part of azodiisobutyronitrile give a similarly effective synthetic lubricant additive.

*Example 18*

A mixture is made of 100 parts of toluene, 20 parts of vinyl stearate, one part of diethyl fumarate, one part of N-vinylpyrrolidinone and one part of 7,7-dimethyl-5-methylene-2,3,5,6-tetrahydro-[7H]-pyrrolo(1,2 - a)imidazole. There is added 0.1 part of azodiisobutyronitrile, and the mixture heated 10 hours at 70° C. The resulting solution of terpolymer is an effective detergent-dispersant for light lubricating oils. This copolymer disperses 0.2% of asphaltenes at 90° C. when used in amounts of 1% and less by weight.

*Example 19*

A 500 cc. round bottom, 3-necked flask was equipped with an addition funnel, a gas inlet tube, a bulb reflux condenser, a thermometer and a glass semi-circular stirrer operated at about 160 r.p.m. The reaction was carried out under a blanket of nitrogen and the temperature was maintained by a controlled, electrically heated oil bath.

The following catalyzed monomer mixture was prepared consisting of 30.0 parts cetyl-stearyl methacrylate, 50.0 parts lauryl-myristyl methacrylate, 15.0 parts n-butyl methacrylate, 5.0 parts white mineral oil and 0.7 part α,α'-azodiisobutyronitrile. Cetyl-stearyl methacrylate is a methacrylate ester prepared from a commercial alcohol which analyzed 2% tetradecanol, 30% hexadecanol and 68% octadecanol. Thirty percent of the above catalyzed monomer mixture was added to the polymerization flask. The time was considered 0.00 hour when the batch temperature reached 85° C. This temperature was maintained during the copolymerization process except at 0.17 hour when an exotherm carried the batch temperature to 105° C. After 0.33 hour the remaining catalyzed monomer mixture was added to the polymerization flask over 1.67 hours. An additional catalyzed monomer mixture was prepared consisting of 3.0 parts 2-methyl-5-vinyl pyridine, 2.0 parts 7,7-dimethyl-5-methylene-2,3,5,6-tetrahydro - [7H] - pyrrolo - (1,2-a)-imidazole, 20.0 parts white mineral oil and 0.3 part α,α'-azodiisobutyronitrile. The second catalyzed monomer mixture was added to the polymerization flask from 2.25 hours until 3.00 hours. An addition of 0.1 part α,α'-azodiisobutyronitrile in 5.0 parts white mineral oil was made at 3.67 hours. An addition of 0.2 part α,α'-azodiisobutyronitrile in 5.0 parts white mineral oil was made at 5.00 hours. Additions of 0.2 part α,α'-azodiisobutyronitrile in 5.0 parts 100 SUS neutral mineral oil were made at 5.67, 6.33 and 7.00 hours, respectively. At 7.50 hours 50.0 parts 100 SUS neutral mineral oil was added. Heating was stopped at 7.67 hours. This oil solution was stripped for one hour at 130° C. under 5 mm. of mercury, resulting in 193.4 parts of solution of copolymer. This solution was found to be 43.8% copolymer, representing a copolymerization yield of 85%. When tested for dispersancy, 0.125% copolymer was found to disperse 0.4% asphaltenes in a mineral oil test blend at 150° C. The viscosity of this oil solution was 344.9 centistokes at 210° F.

In a similar manner using similar amounts there were prepared three copolymers used in place of 2-methyl-5-vinyl-pyridine. In the first copolymer tert-butylaminoethyl methacrylate; in the second copolymer dimethylaminoethyl methacrylate; and in the third copolymer dimethylaminopropyl methacrylamide. Each of these copolymers had the same dispersancy characteristics as the corresponding copolymers containing 2-methyl-5-vinyl-pyridine.

*Example 20*

A 500 cc. flask was used as described in Example 19. The following catalyzed monomer mixture was prepared consisting of 75.0 parts lauryl acrylate, 25.0 parts 7,7-dimethyl-5-methylene-2,3,5,6-tetrahydro-[7H]-pyrrolo(1,2-a)imidazole, 100.0 parts toluene and 0.2 part $\alpha,\alpha'$-azodiisobutyronitrile. Thirty percent of the above catalyzed monomer mixture was added to the polymerization flask. The time was considered 0.00 hour when the batch temperature reached 85° C. This temperature was maintained during the copolymerization process. After 0.33 hour the remaining catalyzed monomer mixture was added to the flask over 1.67 hours. An addition of 0.04 part $\alpha,\alpha'$-azodiisobutyronitrile in 5.0 parts toluene was made at 1.67 hours. Additions of 0.06 part $\alpha,\alpha'$-azodiisobutyronitrile in 5.0 parts toluene were made at 4.00, 4.67, 5.33 and 6.00 hours, respectively. Heating was terminated at 7.00 hours. The resulting solution was 45.5% copolymer, representing a copolymerization yield of 96.2%. When tested for dispersancy 0.25% copolymer was found to disperse 0.2% asphaltenes in a mineral oil test blend at 90° C. The viscosity of a toluene solution, 30.0% copolymer, at 100° F. was 17.3 centistokes.

*Example 21*

A 500 cc. flask was used as described in Example 19. The copolymerization process in this example was identical to the process for Example 20. The initial catalyzed monomer mixture contained the following monomers: cetyl-stearyl methacrylate, lauryl-myristyl methacrylate, mono-n-dodecyl ether methacrylate containing 33 oxyalkylene groups per molecule, where said oxyalkylene groups contain two carbon atoms each, represented by

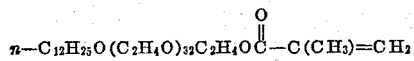

The second catalyzed monomer mixture contained the following monomers: ethyl acrylate and 7,7-dimethyl-5-methylene-2,3,5,6-tetrahydro-[7H]-pyrrolo-(1,2-a)-imidazole. The total amount of each reagent used was as follows: 30.0 parts cetyl-stearyl methacrylate, 40.0 parts lauryl-myristyl methacrylate, 25.8 parts of a 29.1% solution of monolauryl ether of polyethylene glycol methacrylate in naphtha, 20.5 parts ethyl acrylate, 2.0 parts 7,7-dimethyl-5-methylene-2,3,5,6-tetrahydro-[7H]-pyrrolo-(1,2-a)-imidazole, 90.0 parts toluene and 2.4 parts $\alpha,\alpha'$-azodiisobutyronitrile. The resulting copolymer was 43.4% copolymer representing a copolymerization yield of 92.5%. When tested for dispersancy 0.25% copolymer was found to disperse 0.4% asphaltenes in a mineral oil test blend at 150° C. The viscosity of a toluene solution, 30.0% copolymer, at 100° F. was 37.7 centistokes.

*Example 22*

A 500 cc. flask was used as described in Example 19. The copolymerization process in this example was identical to the process for Example 20 except a higher catalyst level was used. The initial catalyst was 0.7 part. The total amount of each reagent used was as follows: 54.5 parts cetyl-stearyl methacrylate, 40.0 parts lauryl-myristyl methacrylate, 2.5 parts styrene, 3 parts 7,7-dimethyl-5-methylene-2,3,5,6-tetrahydro-[7H]-pyrrolo-(1,2-a)-imidazole, 85 parts toluene and 2.1 parts $\alpha,\alpha'$-azodiisobutyronitrile. The resulting solution was 51.2% copolymer representing a copolymerization yield of 88%. When tested for dispersancy 0.125% copolymer was found to disperse 0.2% asphaltenes in a mineral oil test blend at 90° C. The viscosity of a toluene solution, 30.0% copolymer, at 100° F. was 32.2 centistokes.

I claim:

1. A composition comprising a major portion of a member selected from the group consisting of a lubricating oil and a normally liquid hydrocarbon fuel and a minor portion sufficient to prevent sludge deposition of an oil soluble copolymer made from (a) at least one monoethylenically unsaturated polymerizable monomer selected from the class consisting of alkyl ($C_1$-$C_{18}$) methacrylate, alkyl ($C_1$-$C_{18}$) acrylate, acrylamide, acrylonitrile, styrene, dialkyl ($C_1$-$C_{18}$) fumarate, dialkyl ($C_1$-$C_1^4$) maleate, dialkyl ($C_1$-$C_{18}$) itaconate and vinyl esters of monocarboxylic acids, in which the carboxylic acid portion contains from 2 to 18 carbon atoms and (b) at least one compound having the formula

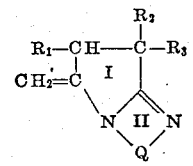

in which $R_1$ is a member selected from the class consisting of hydrogen and alkyl of one to five carbon atoms, $R_2$ and $R_3$ taken individually are members selected from the class consisting of hydrogen and hydrocarbon groups of 1 to 10 carbon atoms selected from the class consisting of alkyl, aralkyl, cycloalkyl, aryl and alkaryl groups, $R_1$ and $R_2$ taken collectively with the carbon atoms to which they are joined form a carbocyclic ring of 5 to 6 carbon atoms including alkyl substituents of a total of no more than 4 additional carbon atoms, $R_2$ and $R_3$ taken collectively with the carbon atoms to which they are joined form a carbocyclic ring of 5 to 6 carbon atoms including alkyl substituents of a total of no more than 4 additional carbon atoms, Q is a hydrocarbon group of 2 to 18 carbon atoms in which there are two to three carbon atoms between the two nitrogen atoms to which Q is attached and ring I including substituents contains up to 24 carbon atoms, in which there is employed from 0.5% by weight to 50 mole percent of said (b) in the copolymer.

2. A composition according to claim 1 in which there is employed at least 0.1% by weight of said copolymer in a lubricating oil.

3. A composition according to claim 1 in which there is employed at least 0.001% by weight of said copolymer in a normally liquid hydrocarbon fuel.

4. A composition according to claim 1 in which
$R_1$ is hydrogen,
$R_2$ is methyl,
$R_3$ is alkyl of 1 to 10 carbon atoms,
Q is ethylene and said monoethylenically unsaturated polymerizable monomer is alkyl ($C_1$—$C_{18}$) methacrylate.

5. A composition according to claim 1 in which
$R_1$ is hydrogen,
$R_2$ is methyl,
$R_3$ is alkyl of 1 to 10 carbon atoms,
Q is ethylene and said monethylenically unsaturated polymerizable monomer is alkyl ($C_1$—$C_{18}$) acrylate.

6. A composition according to claim 1 in which
R$_1$ is hydrogen,
R$_2$ is methyl,
R$_3$ is alkyl of 1 to 10 carbon atoms,
Q is ethylene and said monoethylenically unsaturated polymerizable monomer is dialkyl (C$_1$—C$_{18}$) fumarate.

7. A composition according to claim 1 in which
R$_1$ is hydrogen,
R$_2$ is methyl,
R$_3$ is alkyl of 1 to 10 carbon atoms,
Q is ethylene and said monoethylenically unsaturated polymerizable monomer is dialkyl (C$_1$—C$_{18}$) itaconate.

8. A composition according to claim 1 in which
R$_1$ is hydrogen,
R$_2$ is methyl,
R$_3$ is alkyl of 1 to 10 carbon atoms,
Q is ethylene and said monoethylenically unsaturated polymerizable monomer is a vinyl ester of a monocarboxylic acid in which the average group weight of the acid portion of said ester is at least eight carbon atoms, said ester being free of reactive substituents.

9. A composition comprising a major portion of a member selected from the group consisting of a lubricating oil and a normally liquid hydrocarbon fuel and a minor portion sufficient to prevent sludge deposition of an oil-soluble copolymer of lauryl-myristyl methacrylate and 7,7-dimethyl-5-methylene-2,3,5,6-tetrahydro-[7H]-pyrrolo(1,2-a)imidazole, in which there is employed from 0.5 percent by weight to 50 mole percent of said imidazole.

10. A composition comprising a major portion of a member selected from the group consisting of a lubricating oil and a normally liquid hydrocarbon fuel and a minor portion sufficient to prevent sludge deposition of an oil-soluble copolymer of lauryl-myristyl methacrylate, methyl acrylate and 7,7-dimethyl-5-methylene-2,3,5,6-tetrahydro-[7H]-pyrrolo(1,2-a)imidazole, in which there is employed from 0.5 percent by weight to 50 mole percent of said imidazole.

11. A composition comprising a major portion of a member selected from the group consisting of a lubricating oil and a normally liquid hydrocarbon fuel and a minor portion sufficient to prevent sludge deposition of an oil-soluble copolymer of vinyl stearate, vinyl butyrate and 7,7-dimethyl-5-methylene-2,3,5,6-tetrahydro-[7H]-pyrrolo(1,2-a)-imidazole, in which there is employed from 0.5 percent by weight to 50 mole percent of said imidazole.

12. A composition comprising a major portion of a member selected from the group consisting of a lubricating oil and a normally liquid hydrocarbon fuel and a minor portion sufficient to prevent sludge deposition of an oil-soluble copolymer of cetyl-stearyl methacrylate, lauryl-myristyl methacrylate, butyl methacrylate, 2-methyl-5-vinyl pyridine and 7,7-dimethyl-5-methylene-2,3,5,6-tetrahydro-[7H]-pyrrolo(1,2-a)imidazole, in which there is employed from 0.5 percent by weight to 50 mole percent of said imidazole.

13. A composition comprising a major portion of a member selected from the group consisting of a lubricating oil and a normally liquid hydrocarbon fuel and a minor portion sufficient to prevent sludge deposition of an oil-soluble copolymer of cetyl-stearyl methacrylate, lauryl-myristyl methacrylate, styrene and 7,7-dimethyl-5-methylene-2,3,5,6-tetrahydro-[7H]-pyrrolo(1,2-a) imidazole, in which there is employed from 0.5 percent by weight to 50 mole percent of said imidazole.

References Cited by the Examiner

UNITED STATES PATENTS

| 2,993,049 | 7/1961 | Bortnick et al. | 252—50 X |
| 3,052,648 | 9/1962 | Bauer | 252—51.5 X |

OTHER REFERENCES

Biswell et al.: "A New Class of Polymeric Dispersants for Hydrocarbon Systems," ACS paper published by Du Pont, March 1954, pages 1–7 pertinent.

DANIEL E. WYMAN, *Primary Examiner.*

JULIUS GREENWALD, *Examiner.*